(12) United States Patent
Samarkin et al.

(10) Patent No.: US 11,767,461 B1
(45) Date of Patent: Sep. 26, 2023

(54) LONG-TERM HYDRAULIC FRACTURE CONDUCTIVITY THROUGH ROCK STRENGTHENING VIA THE FORMATION OF FLUORITE

(71) Applicants: SAUDI ARABIAN OIL COMPANY, Dhahran (SA); KING FAHD UNIVERSITY OF PETROLEUM & MINERALS, Dhahran (SA)

(72) Inventors: Yevgeniy Samarkin, Dhahran (SA); Murtada Saleh Aljawad, Qatif (SA); Theis Solling, Khobar (SA); Murtadha J. AlTammar, Dhahran (SA); Khalid Mohammed Alruwaili, Dammam (SA)

(73) Assignees: SAUDI ARABIAN OIL COMPANY, Dhahran (SA); KING FAHD UNIVERSITY OF PETROLEUM & MINERALS, Dhahran (SA)

( * ) Notice: Subject to any disclaimer, the term of this patent is extended or adjusted under 35 U.S.C. 154(b) by 0 days.

(21) Appl. No.: 17/664,955

(22) Filed: May 25, 2022

(51) Int. Cl.
*C09K 8/504* (2006.01)
*C09K 8/80* (2006.01)
*E21B 43/26* (2006.01)

(52) U.S. Cl.
CPC ............. *C09K 8/5045* (2013.01); *C09K 8/80* (2013.01); *E21B 43/26* (2013.01)

(58) Field of Classification Search
None
See application file for complete search history.

(56) References Cited

U.S. PATENT DOCUMENTS

| 2006/0027365 | A1 | 2/2006 | Park et al. | |
| 2012/0325472 | A1* | 12/2012 | Litvinets | C09K 8/80 166/280.1 |
| 2017/0335174 | A1* | 11/2017 | Blattel | C09K 8/72 |
| 2021/0246363 | A1* | 8/2021 | Al-Jawad | C09K 8/72 |

OTHER PUBLICATIONS

Abass, H.H., et al., "Acid Fracturing or Proppant Fracturing in Carbonate Formation? A Rock Mechanic's View", SPE 102590, Society of Petroleum Engineers, Sep. 2006, pp. 1-9 (9 pages).
Alakbari, Fahd Saeed, et al., "Chemical Sand Consolidation: From Polymers to Nanoparticles", Polymers, MDPI, vol. 12, No. 1069, 2020, pp. 1-30 (30 pages).

(Continued)

*Primary Examiner* — Andrew Sue-Ako
(74) *Attorney, Agent, or Firm* — Osha Bergman Watanabe & Burton LLP

(57) ABSTRACT

A method of treating a carbonate formation includes introducing a stimulation fluid into the carbonate formation at a pressure greater than a fracture pressure of the formation and creating openings in the carbonate formation via the stimulation fluid. Then, a fluoride salt solution, optionally including a proppant, may be introduced into the carbonate formation such that it at least partially penetrates into the openings. The fluoride salt may then be reacted with a carbonate surface in the carbonate formation to form fluorite on a surface of the formation thereby increasing a hardness of the carbonate formation.

14 Claims, 4 Drawing Sheets

(56) References Cited

OTHER PUBLICATIONS

Aljawad, Murtada Saleh, et al., "Improving carbonate rock hardness by consolidating additives to sustain long term fracture conductivity", Journal of Petroleum Science and Engineering, ScienceDirect, Elsevier B.V., vol. 195, No. 107897, 2020 (12 pages).

Ames, L.L., Jr., "The Metasomatic Replacement of Limestones by Alkaline, Fluoride-Bearing Solutions", Economic Geology, vol. 56, 1961, pp. 730-739 (10 pages).

Baer, N.S., et al., "The Replacement of Calcite by Fluorite: A Kinetic Study", The American Mineralogist, vol. 55, Mar.-Apr. 1970, pp. 466-476 (11 pages).

Bandara, K.M.A.S., et al., "Improved understanding of proppant embedment behavior under reservoir conditions: A review study", Powder Technology, ScienceDirect, Elsevier B.V., vol. 352, 2019, pp. 170-192 (23 pages).

Desouky, Mohmoud, et al., "Improving long-term hydraulic fracture conductivity by alteration of rock minerals", Journal of Petroleum Science and Engineering, ScienceDirect, Elsevier, vol. 196, No. 108046, 2021 (10 pages).

Du, Yang, et al., "Biosoption of divalent Pb, Cd, and Zn on aragonite and calcite mollusk shells", Environmental Pollution, ScienceDirect, Elsevier Ltd., vol. 159, 2011, pp. 1763-1768 (6 pages).

Glover, E.D. and R.F. Sippel, "Experimental Pseudomorphs: Replacement of Calcite by Fluorite", The American Mineralogist, vol. 47, Sep.-Oct. 1962, pp. 1156-1165 (10 pages).

Grayson, John F., "The Conversion of Calcite to Fluorite", Micropaleontology, vol. 2, No. 1, Jan. 1956, pp. 71-78 (8 pages).

Godelitsas, Athanasios, et al., "Interaction Calcium Carbonates with Lead in Aqueous Solutions", Environmental Science and Technology, American Chemical Society, vol. 37, No. 15, 2003, pp. 3351-3360 (10 pages).

Kaushansky, P. and S. Yariv, "The interactions between calcite particles and aqueous solutions of magnesium, barium or zinc chlorides", Applied Geochemistry, Pergamon Journals Ltd., vol. 1, 1986, pp. 607-618 (12 pages).

Mishra, Saurabh and Keka Ojha, "Chemical Sand Consolidation: An Overview", Journal of Petroleum Engineering & Technology, STM Journals, vol. 5, Issue 2, 2015, pp. 21-34 (14 pages).

Pedrosa, E.T., et al., "Porosity generated during the fluid-mediated replacement of calcite by fluorite", CrystEngComm, The Royal Society of Chemistry, 2016 (8 pages).

Pedrosa, Elisabete Trindade, et al., "The replacement of a carbonate rock by fluorite: Kinetics and microstructure", American Mineralogist, vol. 102, 2017, pp. 126-134 (9 pages).

Prieto, Manuel, et al., "Uptake of dissolved Cd by biogenic and abiogenic aragonite: a comparison with sorption onto calcite", Geochimica et Cosmochimica Acta, Pergamon, vol. 67, No. 20, 2003, pp. 3859-3869 (11 pages).

Tomasin, Patrizia, et al., "Calcium alkoxides for stone consolidation: Investigating the carbonation process", Powder Technology, Science Direct, Elsevier B.V., vol. 344, 2019, pp. 260-269 (10 pages).

Turner, Brett D., et al., "Fluoride Removal by Calcite: Evidence for Fluorite Precipitation and Surface Adsorption", Environmental Science & Technology, American Chemical Society, vol. 39, No. 24, 2005, pp. 9561-9568 (8 pages).

Yuan, Ke, et al., "The replacement of calcite ($CaCO$) by cerussite ($PbCO$)", Environmental Science & Techology, ACS Publications, Oct. 2016 (23 pages).

* cited by examiner

LONG-TERM HYDRAULIC FRACTURE CONDUCTIVITY THROUGH ROCK STRENGTHENING VIA THE FORMATION OF FLUORITE

BACKGROUND

Hydraulic fracturing is a commonly utilized technique to create fractures within a formation to allow access to additional hydrocarbons downhole. The conductivity of the created fractures is critical to recovering the hydrocarbons exposed via the fractures. Over time, the conductivity of the fractures tends to decrease due to formation closure stresses. The decrease in conductivity is especially rapid in soft formations, such as carbonate, and is exacerbated by the use of acids. Problems such as proppant embedment or asperities failure may result in lower hydrocarbon production.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method of treating a carbonate formation that includes introducing a stimulation fluid into the carbonate formation at a pressure greater than a fracture pressure of the formation, creating openings in the carbonate formation via the stimulation fluid, introducing a fluoride salt solution into the carbonate formation such that it at least partially penetrates into the openings, and reacting the fluoride salt with a carbonate surface in the carbonate formation to form fluorite on a surface of the formation thereby increasing a hardness of the carbonate formation.

In another aspect, embodiments disclosed herein relate to a method of treating a carbonate formation that includes introducing a stimulation fluid into the carbonate formation at a pressure higher than a fracture pressure of the formation, creating openings in the carbonate formation via the stimulation fluid, introducing a fluoride salt solution comprising a proppant into the carbonate formation such that it at least partially penetrates into the openings, and reacting the fluoride salt with a carbonate surface in the carbonate formation to form fluorite on a surface of the formation thereby increasing a hardness of the carbonate formation.

Other aspects and advantages of the claimed subject matter will be apparent from the following description and the appended claims.

DETAILED DESCRIPTION

The present disclosure generally relates to methods of hardening carbonate rocks to reduce problems associated with decreased fracture conductivity. The hardness of carbonate formations may be increased by introducing an aqueous fluoride salt solution into the formation. The fluoride salt reacts with the carbonate surface, thereby forming a layer of fluorite inside the formation. Fluorite is harder than carbonate, so fracture conductivity may be better maintained in formations treated with fluoride salts as described herein.

Figure 1:
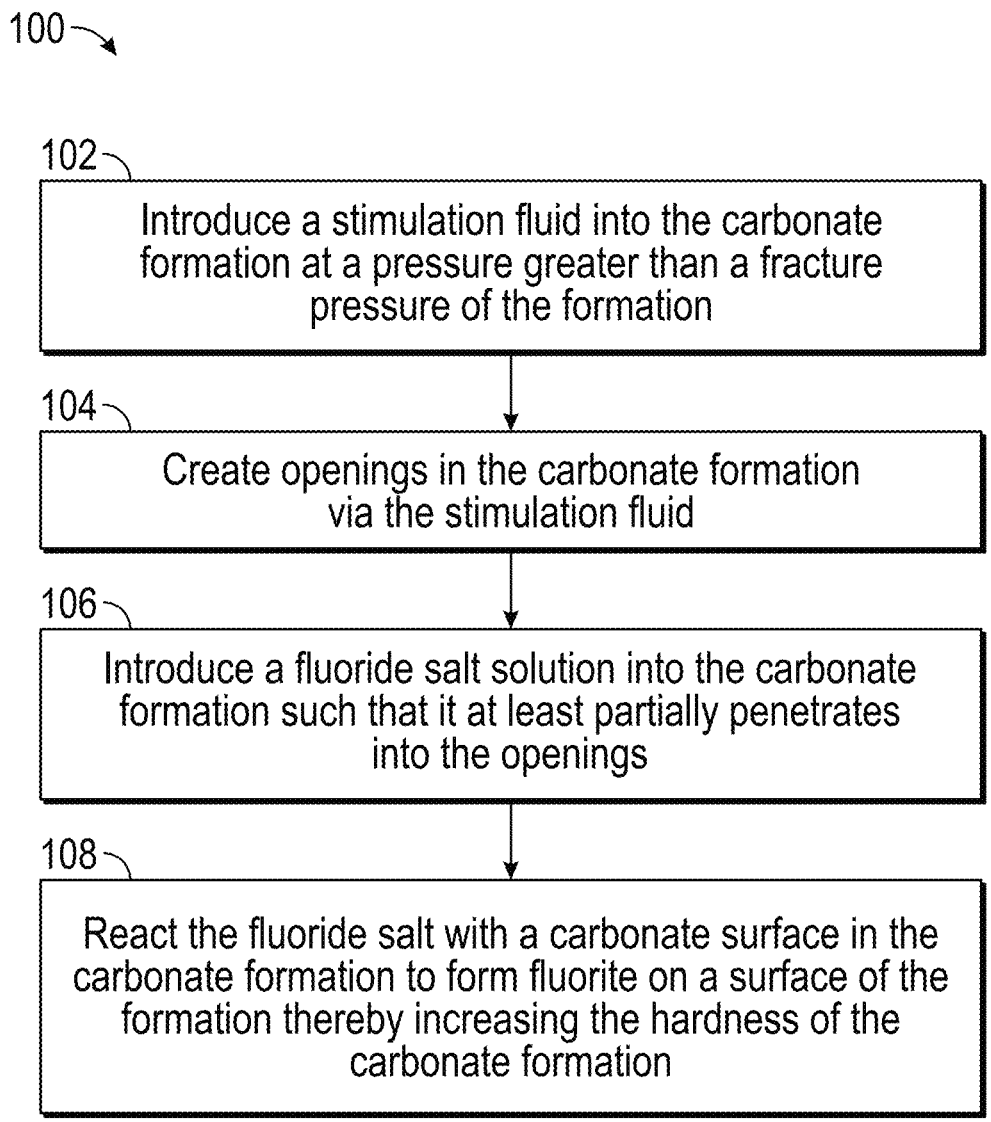
FIG. 1 is a block flow diagram of a method in accordance with one or more embodiments.

In one aspect, embodiments disclosed herein relate to a method of treating a hydrocarbon bearing formation. A method 100 in accordance with one or more embodiments of the present disclosure is shown in FIG. 1. First, a stimulation fluid may be introduced into the carbonate formation at a pressure greater than a fracture pressure of the formation (step 102). The stimulation fluid may be a fracturing fluid, for example, and may include an acid in particular embodiments.

The fracturing fluids of one or more embodiments may include, for example, water-based fracturing fluids. In one or more embodiments, the water-based fracturing fluids may comprise an aqueous fluid. The aqueous fluid may include at least one of fresh water, seawater, brine, water-soluble organic compounds, and mixtures thereof. The aqueous fluid may contain fresh water formulated to contain various salts. The salts may include, but are not limited to, alkali metal halides and hydroxides. In one or more embodiments, brine may be any of seawater, aqueous solutions wherein the salt concentration is less than that of seawater, or aqueous solutions wherein the salt concentration is greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. In one or more embodiments, the density of the aqueous fluid may be controlled by increasing the salt concentration in the brine, though the maximum concentration is determined by the solubility of the salt. In particular embodiments, brine may include an alkali metal halide or carboxylate salt and/or alkaline earth metal carboxylate salts.

The fracturing fluids may be used alone to fracture the formation. Alternatively, they may be used with a sufficient quantity of a proppant. Such proppants may include gravel, sand, bauxite, or glass beads. Proppants may be uncoated or coated with resins such as epoxy, furan, novolak, polyepoxide resins, furan/furfuryl alcohol resins, phenolic resins, urea-aldehyde resins, urethane resins, phenolic/latex resins, phenol formaldehyde resins, polyester resins and acrylate resins and copolymers and mixtures thereof. The particle size of the proppants may be from about 2 to about 400 mesh U.S. Sieve Series. The resulting fluid slurry may have a weight of particulate material per gallon of slurry ranging from as low as about 1 ppg, up to about 20 ppg, or from about 5 ppg to about 20 ppg. Ppg is pounds of proppant to gallons of fracturing fluid.

The fracturing fluids may also include one or more acids. The acid may be any suitable acid known to a person of ordinary skill in the art, and its selection may be determined by the intended application of the fluid. In some embodiments, the acid may be one or more selected from the group consisting of hydrochloric acid, sulfuric acid, carboxylic acids such as acetic acid, and hydrofluoric acid. In some embodiments, the hydrofluoric acid may be included as a hydrogen fluoride source, such as ammonium fluoride, ammonium bifluoride, fluoroboric acid, hexafluorophosphoric acid, and the like.

The fracturing fluid of one or more embodiments may comprise the one or more acids in a total amount of the range of about 0.01 to 30.0 wt. %. For example, the fracturing fluid may contain the acids in an amount ranging from a lower limit of any of 0.01, 0.05, 0.1, 0.5, 1.0, 5.0, 10, 15, 20, and 25 wt. % to an upper limit of any of 0.5, 1.0, 5.0, 10, 15, 20, 25, and 30 wt. %, where any lower limit can be used in combination with any mathematically-compatible upper limit.

The fracturing fluids of one or more embodiments may include one or more additives. The additives may be any conventionally known and one of ordinary skill in the art will, with the benefit of this disclosure, appreciate that the selection of said additives will be dependent upon the intended application of the fracturing fluid. In some embodiments, the additives may be one or more selected from clay stabilizers, scale inhibitors, corrosion inhibitors, biocides, friction reducers, thickeners, fluid loss additives, and the like.

The fracturing fluid of one or more embodiments may comprise the one or more additives in a total amount of the range of about 0.01 to 15.0 wt. %. For example, the fracturing fluid may contain the additives in an amount ranging from a lower limit of any of 0.01, 0.05, 0.1, 0.5, 1.0, 2.5, 5.0, 1.5, 10.0 and 12.5 wt. % to an upper limit of any of 0.1, 0.5, 1.0, 2.5, 5.0, 7.5, 10.0, 12.5, 15.0, 20.0 and 30.0 wt. %, where any lower limit can be used in combination with any mathematically-compatible upper limit.

Referring back to FIG. 1, the introduction of the stimulation fluid at a pressure greater than the fracture pressure of the formation 102 creates openings in the carbonate formation 104. When a stimulation fluid does not include an acid, the openings may simply be fractures in the formation created by the pressure of the fracturing fluid. In embodiments in which the fracturing fluid contains a proppant, the proppant may be used to prop open and maintain connectivity of the fractures.

The well stimulation process of one or more embodiments may be a matrix stimulation process. In the matrix stimulation process of one or more embodiments, the stimulation fluid contains an acid. The acid may react with the formation, dissolving rock, and creating wormholes that create a pathway for hydrocarbons to be displaced from deeper within the rock. When wormholes are created via acid stimulation, asperities, or uneven surfaces, are created due to acid interaction with the carbonate surfaces. These asperities serve as the support for fracture that keeps it open. However, acids have a tendency to soften the rock. Therefore, the asperities are softened and, when subjected to the high stresses during extraction of hydrocarbons from the formation, easily deform and crush, which reduces conductivity of the openings in the formation.

In order to strengthen the surfaces of the carbonate formation after stimulation, the method 100 in accordance with one or more embodiments includes a step 106 introducing a fluoride salt solution into the carbonate formation such that it at least partially penetrates into the openings. The fluoride salt solution may be an aqueous solution. The aqueous solution may include at least one of fresh water, seawater, brine, water-soluble organic compounds, and mixtures thereof. The aqueous fluid may contain fresh water formulated to contain various salts in addition to the fluoride salt. The salts may include, but are not limited to, alkali metal halides and hydroxides. In one or more embodiments, brine may be any of seawater, aqueous solutions wherein the salt concentration is less than that of seawater, or aqueous solutions wherein the salt concentration is greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine.

The fluoride salt in the fluoride salt solution may be sodium fluoride (NaF) or ammonium fluoride ($NH_4F$). In particular embodiments, the fluoride salt is NaF. The concentration of the fluoride salt in the fluoride salt solution may be in a range of from 0.1 to 1.2 molar (M). The concentration of the fluoride salt may have a lower limit of any one of 0.1, 0.2, 0.3, 0.4, 0.5, 0.6, and 0.7, M and an upper limit of any one of 0.7, 0.8, 0.9, 1.0, 1.1, and 1.2 M, where any lower limit may be paired with any mathematically compatible upper limit. The concentration used may depend upon the temperature of the solution or the temperature at which the solution is to be used in the formation, as well as the particular fluoride salt or mixture of salts being used.

After the introduction of the fluoride salt solution into the formation (step 106), the fluoride salt solution may be maintained inside the formation for a period of time referred to as a "soak time." The soak time of the fluoride salt solution may be from about 24 to 480 hours. For example, the soak time may have a lower limit of any one of 24, 48, 72 96, 120, 180, 240 hours and an upper limit of any one of 96, 120, 180, 240, 300, 360, 420, 480 hours, where any lower limit may be paired with any mathematically compatible upper limit.

Once introduced into the carbonate formation 106, the fluoride salt reacts with a carbonate surface in the carbonate formation to form fluorite on a surface of the formation 108. In one or more particular embodiments, the fluorite is formed on the surface of the formation after a soaking time of about 120 hours. As fluorite is a harder mineral than the carbonate, the presence of fluorite on the surface of the carbonate increases the hardness of the carbonate formation. This increase in hardness may reduce problems associated with decreased fracture conductivity over time.

However, as will be appreciated by those skilled in the art, as the fluoride salt reacts with the carbonate inside the formation, the concentration of the fluoride salt in the fluoride salt solution decreases. Such a decrease in concentration may decrease the reaction rate inside the formation. As such, additional fluoride salt solution may be introduced into the formation after a given soak time of the first fluoride salt solution. For example, in one or more embodiments, a second amount of the fluoride salt solution as described above may be introduced into the formation after a soak time of the first fluoride salt solution. In particular, a first fluoride salt solution may be introduced and maintained inside the formation for a period of about 24 to 120 hours. Then, a second amount of fresh fluoride solution may be introduced and maintained inside the formation for an additional 24 for 120 hours. The introduction of a fresh fluoride salt solution may then react with unreacted portions of the carbonate formation, especially areas near the wellbore, further increasing the hardness of the formation in these areas. The introduction of additional fluoride salt solution may also push the first fluoride salt solution deeper into the formation, thereby encouraging hardening of surfaces farther from the wellbore. Fresh fluoride salt solution may be introduced into the formation any number of times in order to achieve the desired hardness inside the formation. For example, one, two, three, four, five, six or more injections of fresh fluoride salt solutions may be introduced downhole. Each injection of fluoride salt solution may have the concentrations as described above, and may be maintained inside the formation for a suitable soak time as described above.

As described above, fluorite is harder than carbonate. Accordingly, formations that have been treated with a sodium fluoride solution of one or more embodiments to form a layer of fluorite on the formation surface may have an increased hardness. The hardness of a formation may be measured according to any technique known in the art. For example, in particular embodiments, the hardness of the formation, or a rock sample representative of or from the formation, may be measured by a Brinell device. As measured by such device, formations that have been treated with a sodium fluoride solution may exhibit a 4 to 6% increase in hardness over the same formation before treatment. As will be appreciated by one with skill in the art, different hardness measuring techniques may result in different hardness values.

As noted above, the fracturing fluid of one or more embodiments may contain a proppant. However, it does not necessarily contain a proppant. Indeed, in some embodiments of the present disclosure, a proppant is included in the aqueous fluoride salt solution. Thus, the proppant is introduced into the carbonate formation with the fluoride salt solution such that the proppant becomes lodged in the fractures as they are being hardened by the fluoride salt solution. As noted above, multiple injections of fluoride salt solutions may be performed. As such, proppant may be included in any of the fluoride salt solutions introduced into the formation. In particular embodiments when two fluoride salt solution injections are performed, the proppant may be included in the second injection, for example. Yet in other embodiments, a stimulation fluid containing a proppant may be introduced into the formation after the introduction of the fluoride salt solution. After completing the steps of the method described herein, hydrocarbons may be produced from the formation as is the case during normal operations.

Embodiments of the present disclosure may provide at least one of the following advantages. Methods in accordance with the present disclosure may result in an increase in hardness of carbonate formations as compared to carbonate formations that are not treated with fluoride salt solutions. The treated formations with increased hardness may provide better fracture conductivity over time, even during periods of stress, such as hydrocarbon production.

EXAMPLES

Two types of carbonate rocks (Austin Chalk or "CH" and Indiana Limestone "LS") were tested. CH and LS, both comprising>97% $CaCO_3$, were obtained from a local supplier. Sodium fluoride (≥99%) was obtained from Sigma-Aldrich. The CH and LS pieces were cylindrical in shape measuring 3-inches in length and 2.5-inches in diameter.

The crystal structure of the samples was measured using X-ray diffraction (XRD) conducted on an Empyrean XRD (Malvern Panalytical company). Small pieces were chipped away from the samples and then crushed into a powder to be analyzed. Imaging and elemental analysis was conducted on a JCM-7000 NeoScope scanning electron microscope (SEM). Small pieces were chipped away from the samples for analysis by SEM. The hardness of the samples was tested using an indentation technique on a FH-9 (Tinius Olsen) Brinell tester. Briefly, indentations were created with a 5 mm ball in all rocks, applying 62.5 kgf (613 N) for chalk and 125 kgf (1226 N) for limestone samples. Then, the average diameter of each indentation was measured to determine the surface area. The Brinell hardness was then calculated as the ratio of force to the area of the dent.

Austin chalk and Indiana Limestone samples were characterized according to XRD and SEM to obtain baseline physical properties of the samples. Then a hardness test was performed. These comparative samples are referred to as Comparative CH and Comparative LS.

The CH and LS samples were then treated with NaF by dissolving 16.8 g of NaF in 450 ml of deionized water to form a 0.9 M NaF solution. Then the CH and LS samples were immersed into the NaF solution for 120 hours. After immersion in the NaF solution, the CH and LS samples were rinsed in deionized water and dried at room temperature for one week. The CH and LS samples were characterized and tested according to the same protocols as the comparative samples.

Figure 2A:
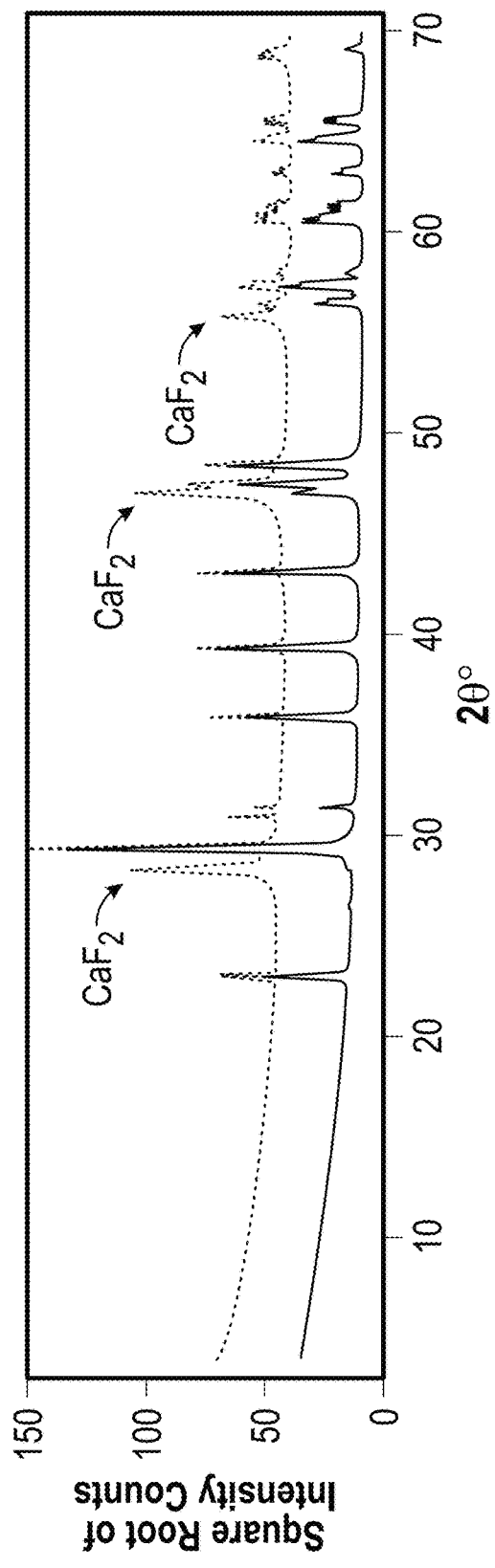
FIG. 2A is a plot of XRD data of inventive and control samples in accordance with one or more embodiments.
Figure 2B:
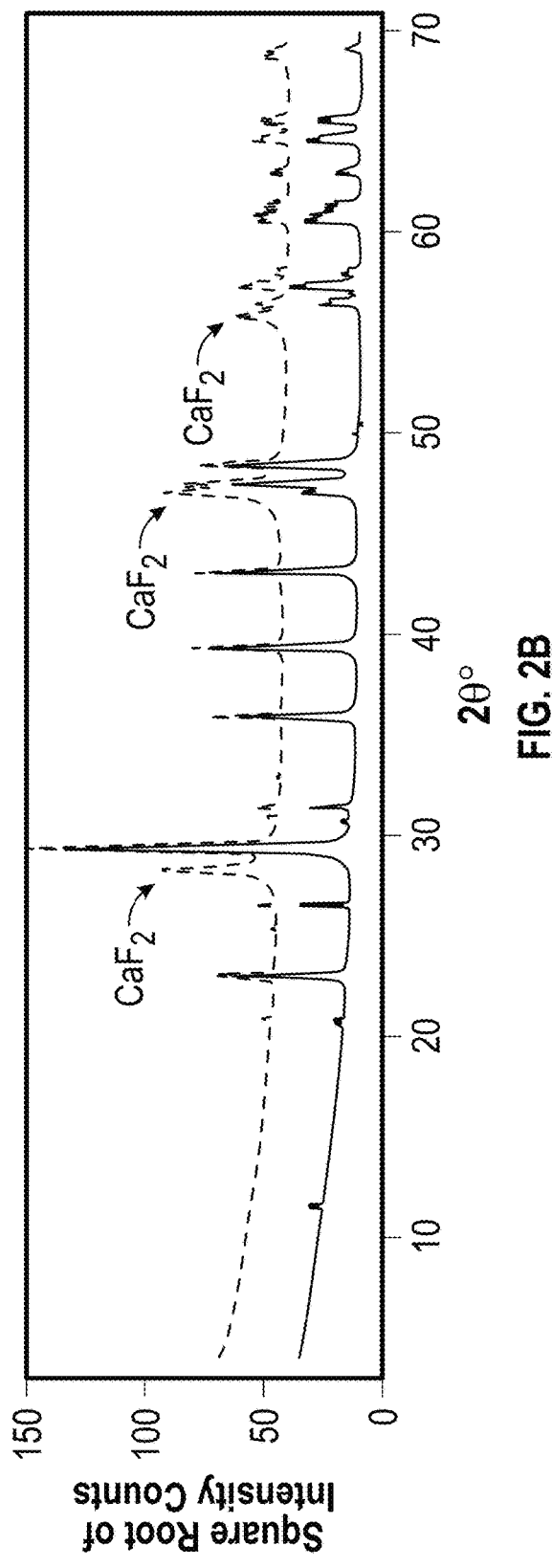
FIG. 2B is a plot of XRD data of inventive and control samples in accordance with one or more embodiments.

The X-ray diffraction data of the samples is shown in FIGS. 2A (Austin chalk samples) and 2B (Indiana limestone samples). The bottom traces in both plots are the comparative samples, and the top traces in both plots are the NaF treated samples. The results of the XRD analyses show that the NaF treatment resulted in the formation of new peaks in the XRD spectra, which confirms that new compounds were formed. New peaks located at 28.3°, 47.1° and 56.0° values of 2θ appeared on XRD spectra of rocks treated by NaF. These peaks were identified as the fluorite mineral ($CaF_2$).

Figure 3A:
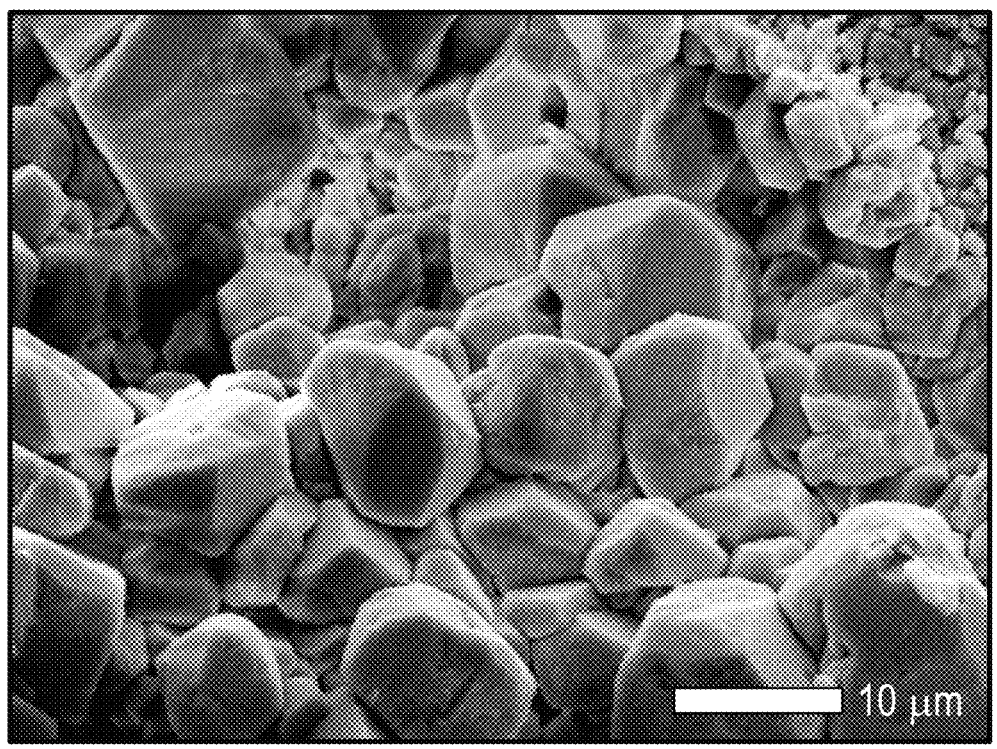
FIG. 3A is an SEM image of an untreated carbonate sample in accordance with one or more embodiments.
Figure 3B:
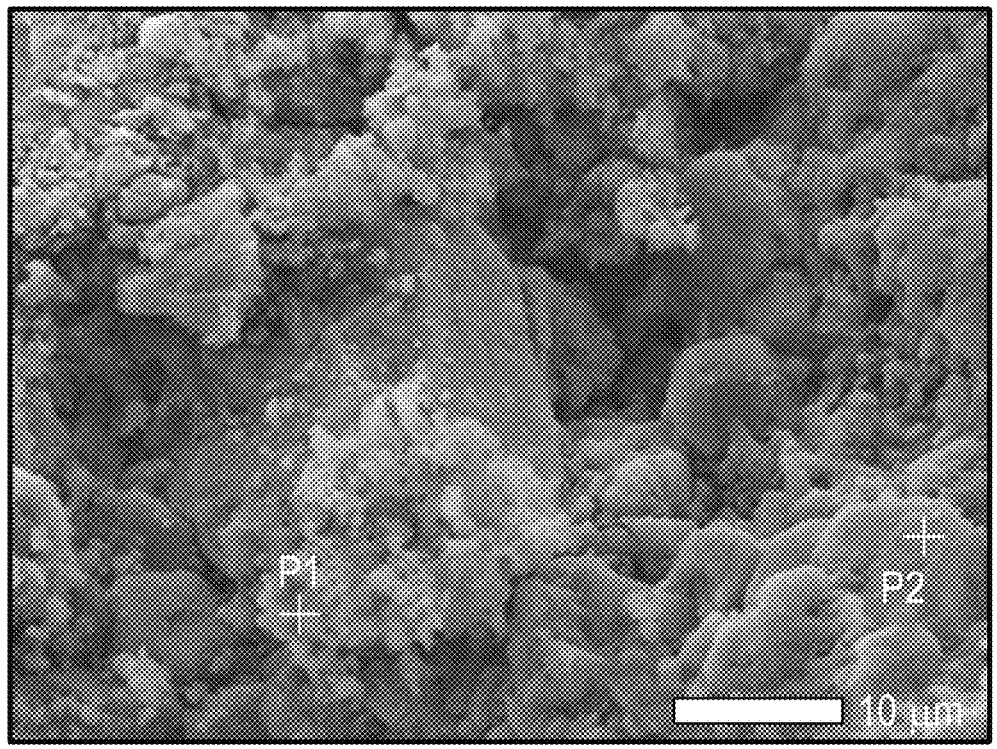
FIG. 3B is an SEM image of a treated carbonate sample in accordance with one or more embodiments.

The changes in mineralogy were also confirmed by SEM imaging. SEM images are shown in FIGS. 3A (untreated rock sample) and FIG. 3B (treated rock sample). Newly formed minerals covered the rock grains, creating an interconnected web, as shown in FIG. 3B. Several surface points of the sample shown in FIG. 3B were chosen for energy-dispersive X-ray spectroscopy analysis (EDS) in order to compare the compositions of treated and untreated grains. In FIG. 3B, point P2 represents the parent $CaCO_3$ grain (i.e., an untreated sample). Point P1 is located on the grain covered by newly formed minerals rich with fluorine atoms. The elemental analysis results for points P1 (treated) and P2 ($CaCO_3$) are shown in Table 1, below.

TABLE 1

| | Elemental analysis via EDS | | | | | | |
|---|---|---|---|---|---|---|---|
| Point | C % | O % | F % | Na % | Ca % | Au % | Total % |
| P1 | 6.48 | 8.11 | 28.86 | 4.1 | 34.66 | 17.79 | 100 |
| P2 | 6.77 | 5.06 | 3.78 | 0.45 | 72.65 | 11.29 | 100 |

The ratio of calcium to fluorine is around 1:2 for point P1, consistent with the molecular formula of $CaF_2$. In contrast, on point P2, there was very little fluorine detected.

Figure 4B:
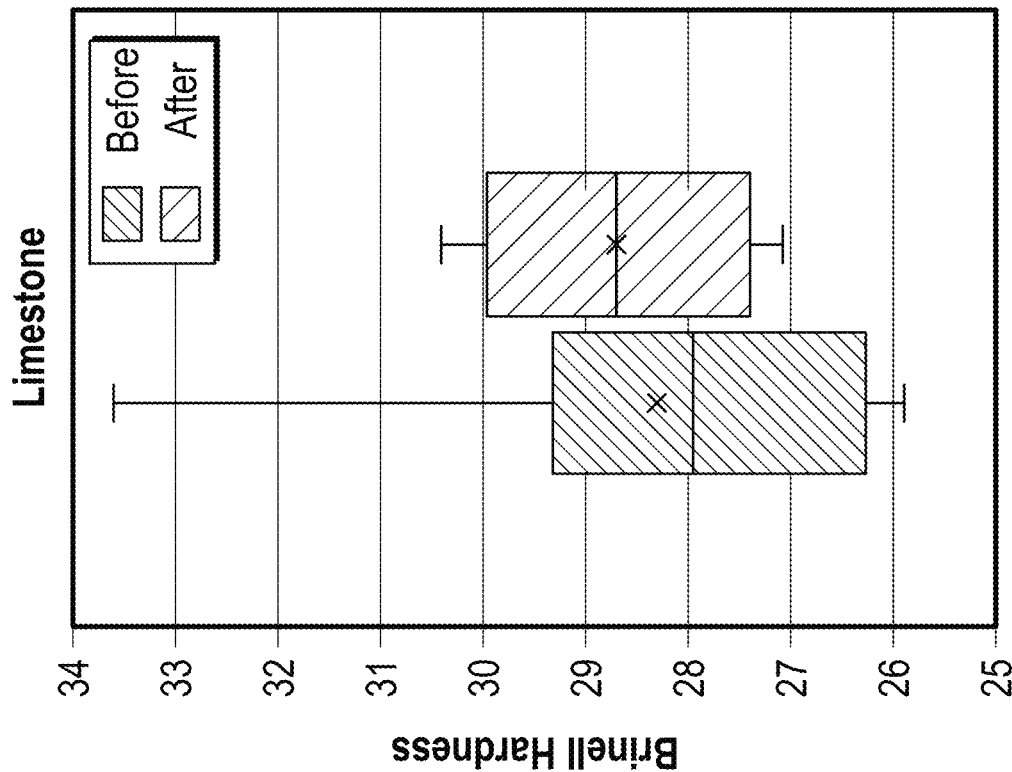
FIG. 4B is a plot showing hardness data for Indiana Limestone samples.
Figure 4A:
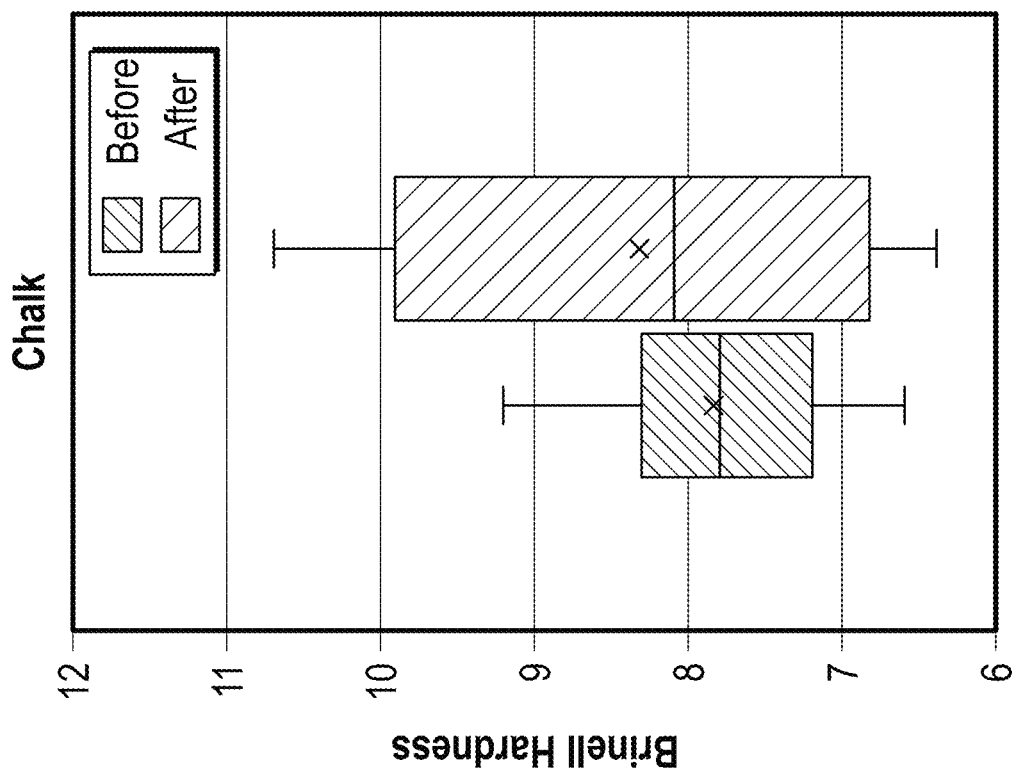
FIG. 4A is a plot showing hardness data for Austin chalk samples.

The hardness of each sample was tested, and the results are shown in FIGS. 4A (CH) and 4B (LS). Brinell hardness tests demonstrated an average hardness increase of 6% in the chalk samples, whereas, for the limestone specimen, hardness improved by 3.8%.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method of treating a carbonate formation, the method comprising:
    introducing a stimulation fluid into the carbonate formation at a pressure greater than a fracture pressure of the formation;
    creating openings in the carbonate formation via the stimulation fluid;
    introducing a fluoride salt solution into the carbonate formation such that it at least partially penetrates into the openings, wherein the fluoride salt is selected from the group consisting of NaF, $NH_4F$, and combinations thereof; and
    reacting the fluoride salt with a carbonate surface in the carbonate formation to form fluorite on a surface of the formation thereby increasing a hardness of the carbonate formation, wherein increasing the hardness of the carbonate formation comprises increasing the hardness by 4 to 6% over the same formation before treatment, as measured by a Brinell device.

2. The method of claim 1, wherein the stimulation fluid is selected from the group consisting of an acidizing fluid, a fracturing fluid and combinations thereof.

3. The method of claim 1, wherein the stimulation fluid comprises a proppant.

4. The method of claim 1, further comprising, after the reacting the fluoride salt with the carbonate, introducing an additional stimulation fluid comprising a proppant into the carbonate formation.

5. The method of claim 1, wherein a concentration of the fluoride salt in the fluoride salt solution is from 0.1 to 5.0 M.

6. The method of claim 1, further comprising, after introducing the fluoride salt solution into the carbonate formation, maintaining the fluoride salt solution in the formation for a time ranging from 24 to 480 hours.

7. The method of claim 6, further comprising, after the maintaining, introducing additional fluoride salt solution into the carbonate formation.

8. The method of claim 1, further comprising producing hydrocarbons from the carbonate formation.

9. A method of treating a carbonate formation, the method comprising:
    introducing a stimulation fluid into the carbonate formation at a pressure higher than a fracture pressure of the formation;
    creating openings in the carbonate formation via the stimulation fluid;
    introducing a fluoride salt solution comprising a proppant into the carbonate formation such that it at least partially penetrates into the openings wherein the fluoride salt is selected from the group consisting of NaF, $NH_4F$, and combinations thereof; and
    reacting the fluoride salt with a carbonate surface in the carbonate formation to form fluorite on a surface of the formation thereby increasing a hardness of the carbonate formation, wherein increasing the hardness of the carbonate formation comprises increasing the hardness by 4 to 6% over the same formation before treatment, as measured by a Brinell device.

10. The method of claim 9, wherein the stimulation fluid is selected from the group consisting of an acidizing fluid, a fracturing fluid and combinations thereof.

11. The method of claim 9, wherein a concentration of the fluoride salt in the fluoride salt solution is from 0.1 to 5.0 M.

12. The method of claim 9, further comprising, after introducing the fluoride salt solution comprising a proppant into the carbonate formation, maintaining the fluoride salt solution in the formation for a time ranging from 24 to 480 hours.

13. The method of claim 12, further comprising, after the maintaining, introducing additional fluoride salt solution into the carbonate formation.

14. The method of claim 9, further comprising producing hydrocarbons from the carbonate formation.

* * * * *